United States Patent
Bender et al.

(10) Patent No.: US 8,055,862 B2
(45) Date of Patent: *Nov. 8, 2011

(54) SYSTEM AND METHOD FOR PROVIDING A BACKUP/RESTORE INTERFACE FOR THIRD PARTY HSM CLIENTS

(75) Inventors: Stefan Bender, Woerrstadt (DE);
Dietmar Fischer, Woerrstadt (DE);
Douglas S. Noddings, Export, PA (US);
James P. Smith, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/035,095

(22) Filed: Feb. 25, 2011

(65) Prior Publication Data

US 2011/0145196 A1 Jun. 16, 2011

Related U.S. Application Data

(63) Continuation of application No. 12/056,389, filed on Mar. 27, 2008, now Pat. No. 7,953,945.

(51) Int. Cl.
*G06F 12/00* (2006.01)
(52) U.S. Cl. .................. 711/161; 711/162; 711/E12.001
(58) Field of Classification Search .......................... None
See application file for complete search history.

(56) References Cited

U.S. PATENT DOCUMENTS 7,103,740 B1 * 9/2006 Colgrove et al. ............. 711/162
2009/0319736 A1 12/2009 Otani et al.

FOREIGN PATENT DOCUMENTS

JP 92009289252 12/2009

OTHER PUBLICATIONS

IBM Tivoli Storage Management Concepts, SG24-4877-00; Published May 2006; by IBM, Available at http://www.redbooks.ibm.com/redbooks/pdfs/sg244877.pdf; Authors Charlotte Brooks et al.
IBM Tivoli Storage Manager Version 5.3 Technical Guide, SG24-6638-00 Published: Mar. 2005 by IBM, Available at http://www.redbooks.ibm.com/redbooks/pdfs/sg246638.pdf, Authors: Roland Tretau et al.

* cited by examiner

*Primary Examiner* — Hetul Patel
(74) *Attorney, Agent, or Firm* — Cantor Colburn LLP; Feb Cabrasawan (57) ABSTRACT

Performing a backup of a stub object located on a file system managed by a hierarchical storage manager configured to migrate data objects from the file system to a migration storage pool. The stub object includes information for recalling a migrated data object and is configured to determine whether a backup copy of the migrated data object is stored in a backup storage pool if the backup is performed in an incremental backup operation. The backup further includes directing the hierarchical storage manager to recall the migrated data object to the file system if the backup copy of the migrated data object is not stored in the backup storage pool or if the backup is performed in a selective backup operation. The backup additionally includes storing a backup copy of the migrated data object in the backup storage pool if the migrated data object is recalled.

20 Claims, 5 Drawing Sheets

SYSTEM AND METHOD FOR PROVIDING A BACKUP/RESTORE INTERFACE FOR THIRD PARTY HSM CLIENTS

CROSS REFERENCE TO RELATED APPLICATIONS

This application is a continuation of U.S. patent application Ser. No. 12/056,389, now U.S. Pat. No. 7,953,945 filed Mar. 27, 2008, the contents of which are incorporated by reference herein in their entirety.

BACKGROUND

Exemplary embodiments of the present invention relate to storage management systems, and more particularly, to backup and archival operations in storage management systems that employ a hierarchical storage manager provided by a third party.

DESCRIPTION OF BACKGROUND

Because of factors such as growing complexity within storage infrastructure, pressure to reduce backup and recovery windows, and constant changes that threaten application availability, conducting efficient and effective storage management for file systems has become increasingly difficult. Remote backup and recovery services such as IBM's Tivoli Storage Manager (TSM) provide users with a network-based system to protect data from hardware failures, errors, and unforeseen disasters by storing backup and archive copies on offline and offsite storage. TSM software provides centralized, Web-based storage administration through policy-based automation of a variety of tasks to enable users to backup, restore, archive, and retrieve data using a hierarchy of data areas (for example, disk, optical, and tape-based media).

Backup procedures are designed to provide the ability to back up successive copies or versions of files to offline storage so that, should an online storage device fail, a data error occur, someone accidentally delete a file, or the data become inaccessible for any other reason, the chosen version of the data can be restored by placing the backup copy back into a designated system. Archive procedures are designed to provide the ability to create a copy of a file or a set of files representing an end point of a process into the hierarchy of storage for long-term retention over a specified amount of time. Archived files can either remain on the local storage media or be deleted. The retrieval process locates the copies within the archival storage and places back into a designated system.

Because higher-speed storage devices (such as hard disk drive arrays) are more expensive than slower devices (such as optical discs and magnetic tape drives), some larger file systems employ a Hierarchical Storage Manager (HSM) to automatically move data between high-cost and low-cost storage media. In a file system managed by an HSM (for example, IBM's TSM HSM for Windows and TSM for Space Management), most of the file system data is stored on slower offline devices and copied to faster online disk drives as needed. The HSM monitors the use of data in a file system, identifies which files in a file system have not been accessed for long periods of time, and migrates all or some of their data to slower storage devices. This frees space in the faster online storage, thereby allowing additional files and more data to be stored. In effect, an HSM provides an economical solution to storage large amounts of data by turning faster disk drives into caches for the slower mass storage devices.

IBM's TSM HSM for Windows provides an HSM client for Windows NTFS file systems operating under Windows 2003. Using this HSM client, individual files from directories, complete NTFS files systems can be migrated to HSM storage according to automated policies based on data longevity, access speed, and cost needs. A migrated file leaves a small piece of the file, called a stub file, on the local file system that contains the necessary metadata to recall the migrated file so that the file appears to reside locally. The migration of files is transparent—Windows users and applications can see and access migrated files like any other file present on the file system, and when a user accesses a migrated file, it is dynamically and transparently restored to client storage. When original files are replaced by stub files, the stub files themselves are backed up to backup storage (for example, by the TSM backup-archive client) when a full backup or an incremental backup is initiated because the files have changed by becoming stub files.

Traditionally, backup operations in file systems managed by an HSM have been accomplished either by recalling all migrated files to back them up or simply backing up only the HSM stubs without corresponding file contents. Restore operations are performed by recreating whatever was backed up. A problem with backing up the file contents of an HSM managed file system is that all files must be recalled. This can overwhelm the local file system by exceeding its ability to store all the recalled files and cause a volume full condition that results in backup failure. A problem with backing up HSM stubs only is that the actual file contents are not preserved in the backup data store. As a result, if for some reason the HSM store is lost, the stubs are useless as they now reference lost records.

The current solution to these problems in HSM-managed file systems is to backup only the HSM stubs while documenting that the HSM data store should never expire. As a result, however, the size of the associated store monotonically increases because file contents are preserved regardless of whether they are still referenced by stubs. Moreover, if for some reason there is corruption of the HSM store, the file contents are lost and cannot be recreated.

BRIEF SUMMARY

The shortcomings of the prior art can be overcome and additional advantages can be provided through exemplary embodiments of the present invention that are related to a method for performing a backup of a stub object located on a file system managed by a hierarchical storage manager configured to migrate data objects from the file system to a migration storage pool is provided. The stub object includes information for recalling a migrated data object. The method comprises determining whether a backup copy of the migrated data object is stored in a backup storage pool if the backup is performed in an incremental backup operation; directing the hierarchical storage manager to recall the migrated data object to the file system if the backup copy of the migrated data object is not stored in the backup storage pool or if the backup is performed in a selective backup operation; creating the backup copy of the migrated data object if the migrated data object is recalled; storing the backup copy of the migrated data object in the backup storage pool if the migrated data object is recalled; creating a backup copy of the stub object if the migrated data object is not recalled; storing the backup copy of the stub object from the file system in the backup storage pool if the migrated data object is not recalled; and logically grouping the backup copy of the migrated data object with the backup copy of the stub object in the backup storage pool such that the backup copy of the migrated data object cannot be deleted from the backup storage pool unless the backup copy of the stub object does not exist in the backup storage pool if the migrated data object is not recalled.

The shortcomings of the prior art can also be overcome and additional advantages can also be provided through exemplary embodiments of the present invention that are related to computer program products and data processing systems corresponding to the above-summarized method are also described herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of exemplary embodiments of the summarized invention, technically we have achieved a solution that can be implemented within a storage management environment to provide an interface for a third party hierarchical storage manager (HSM) client component to interoperate with a backup-restore client component that enables efficient and effective back up of both HSM stub information and the associated file contents. As a result, after back up has performed on migrated files, either the stub files or the corresponding file contents can be restored to a client file system. Thus, in situations where the migrated file content store is missing, the complete file contents will still be available to be restored.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

As will now be described, exemplary embodiments of the present invention can be implemented within a storage management environment to provide an interface for a third party hierarchical storage manager (HSM) client component to interoperate with a backup-restore client component that enables efficient and effective back up of both HSM stub information and the associated file contents. As a result, after back up has performed on migrated files, either the stub files or the corresponding file contents can be restored to a client file system. Thus, in situations where the migrated file content store is missing, the complete file contents will still be available to be restored.

Figure 1:
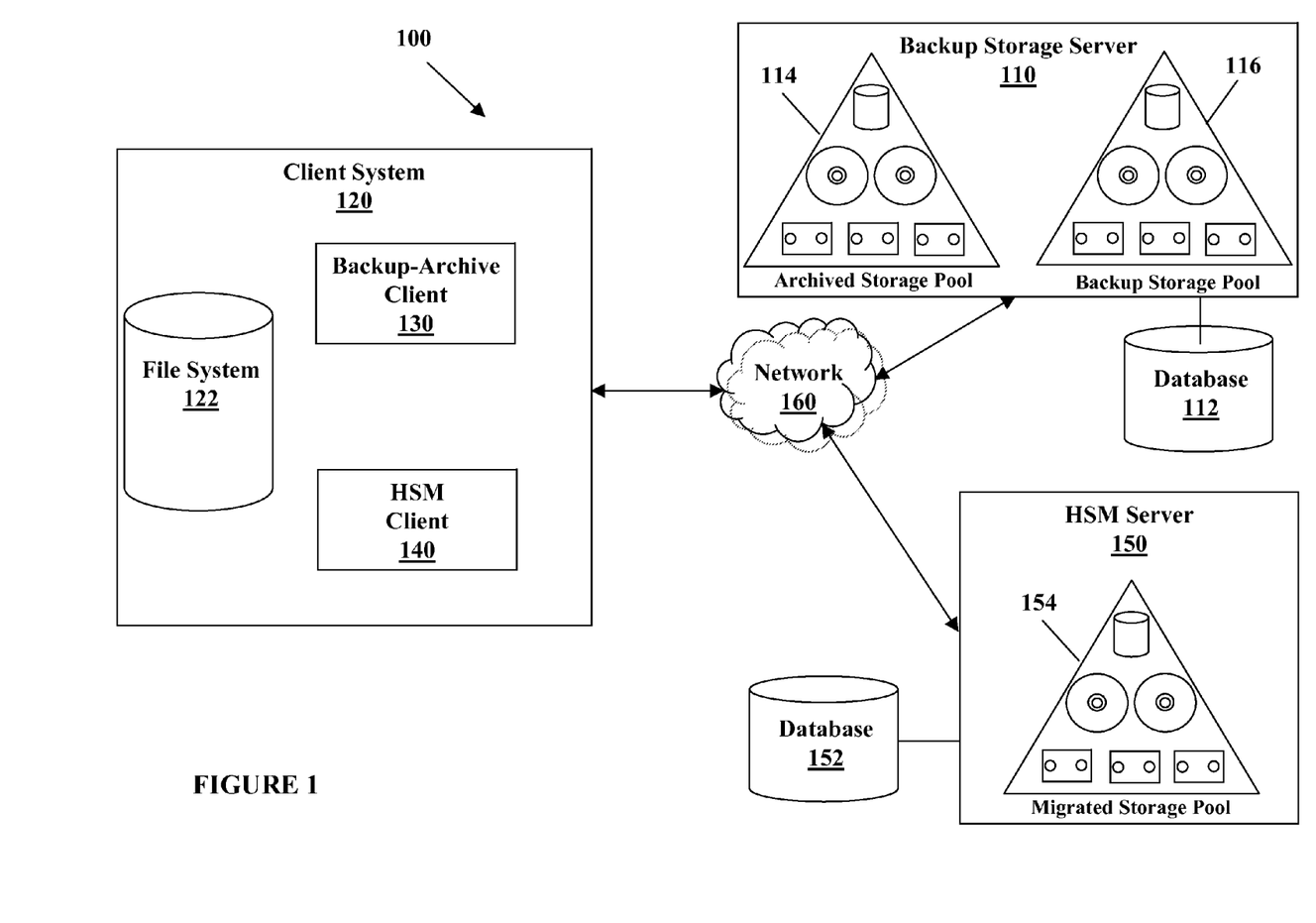
FIG. 1 is a block diagram illustrating an exemplary storage management environment within which exemplary embodiments of the present invention can be implemented.

Referring now to FIG. 1, an exemplary embodiment of a remote backup storage management environment, indicated generally by 100, is illustrated. Storage management environment 100 provides a client-server architecture for distributed data and storage management that comprises three basic types of resources: client systems, policies, and data. The client systems contain file system storing the data to be managed, and the policies specify how the management must occur (for example, in the case of backup, how many versions should be kept, where they should be stored, etc.). The data may comprise application data such as database data of any type or any other data used by client system alone or as part of a distributed software application such as e-mail or networked database. Exemplary embodiments of storage management environment 100 can be implemented to protect a client's data against hardware failure and other errors by storing backup and archive copies of data in offline storage, and the storage management environment can scale to protect hundreds of computers ranging from laptops and mobile computers to mainframes and large-scale enterprise servers, running a variety of different operating system platforms (for example, IBM AIX, HP-UX, Microsoft Windows, or Sun Solaris), and connected locally, via the Internet, wide area networks (WANs), local area networks (LANs), or storage area networks (SANs), and each client system can comprises any number of file systems containing data to be managed. Exemplary embodiments can leverage different communication protocols such as, for example, TCP/IP. Therefore, the particular implementation of storage management environment illustrated in FIG. 1 is exemplary only and should be considered non-limiting.

As illustrated in FIG. 1, storage management environment 100 includes a back storage server 110, an HSM server 150, and a storage manager client system 120. Client system 120 comprises a file system 122 containing the data to be managed, and includes a backup-archive client component 130 and a third party HSM client component 140. Backup-archive client 130 is implemented to transfer data to and receive data from server 110 using an internal interface via a network 160. HSM client 140 is implemented to transfer data to and receive data from server 150 using an internal interface via network 160. Server 110 can comprise any backend storage system supported by backup-archive client 130, and server 150 can comprise any backend storage system supported by HSM client 140. File system 122 can be stored on one or more logical and/or physical storage devices of any type (for example, hard disk, flash memory, etc.) for storing data on client system 120. Backup storage server 110 implements the storage management policies and maintains all object inventory information necessary to perform management of the backup and archived data, HSM server 150 implements the storage management policies and maintains all object inventory information necessary to perform management of the migrated data, backup-archive client 130 implements data backup and recovery functions, and HSM client 140 implements hierarchical space management functions. In exemplary embodiments, the client software can run on different systems, including laptop computers, PCs, workstations, or server systems. In exemplary embodiments, the client and server software can also be installed on the same system to provide local backup and space management solutions.

Servers 110, 150 each include a respective relational database 112, 152 that maintains metadata (for example, in XML) added when client data is stored to describe the stored client data. The metadata includes all client and administrative policy information and other information used for managing data such as logging, authentication and security, media management, and object inventory information. The data fields of relational databases 112, 152 can be externalized using an Open Database Connectivity (ODBC) driver. To maintain data integrity, databases 112, 152 can use a recovery log to roll back any changes made if a data transaction is interrupted before it completes. Backup storage server 110 includes storage repositories 114, 116 for storing the backup and archive data, and HSM server 150 includes a storage repository 154 for storing the backup and archive data. The storage repositories can each be implemented using any combination of supported media such as magnetic or optical disk, tape, and robotic storage devices, which are locally connected to storage manager server 110 or, alternatively, accessible through a storage area network (SAN) using a storage agent configured to read and write client data directly to and from server-provided storage devices. Storage repositories 114, 116 are controlled by server 110, which can use its own model of storage to view, classify, and control the storage devices, and to implement the storage management functionality, and storage repository 154 is controlled by server 150, which also can use its own model of storage to view, classify, and control the storage devices, and to implement the space management functionality. Servers 110, 150 can use logical definitions to classify the available physical storage resources into storage pools that each describe a storage resource for one single type of media; for example, a disk partition or a set of tape cartridges.

In exemplary embodiments, the functionality implemented by servers 110, 150 can concentrate on managing data objects as they exist in the storage pools, rather than just the backup tapes as a whole. Data objects can be, for example, sub-file components, files, directories or raw logical volumes that are backed up from the client systems; they can be objects like tables or records from database applications, or simply a block of data that a client system wants to store on the server storage. Each object has an associated management policy "bound" to it that defines what the corresponding server does with that object. Within the storage repositories, the storage devices can be linked together to form a storage hierarchy of one or more hierarchical structures. The storage hierarchy is not limited in the number of levels and can also span over multiple servers using virtual volumes in exemplary embodiments.

HSM server 150 is utilized by HSM client 140 to implement policy-based space hierarchical storage management functions for migrating data objects, automatically and transparently, from client system 120 to a migration storage pool in storage repository 154, and from one storage hierarchy level to another in storage repository 154. HSM client 140 monitors the way files are used and can be implemented to manage the migration of individual files, files from parts of client file system 122, or the complete client system to the remote migration storage pool maintained by server 150 in storage repository 154. This function may be used, for example, to store migrate client data (for performance reasons) onto server disk space before migrated the data again to tape cartridges. HSM client 140 can be implemented with a graphical or command line user interface, or a combination of both, that allows a user to define and schedule migration jobs, and to automate policies regarding which files can safely be moved (migrated) to slower devices and which files should stay on the hard disks. A user or administrator can define migration jobs through the user interface of HSM client 140 to control the migration process such that parts of the directory structure of file system 122 can be included or excluded. The actual migration can be scheduled using a standard scheduler, or it can be started manually through the user interface. HSM client 140 can be implemented as a multi-session client to exploit multi-threading capabilities of modern operating systems and enable the running of these operations in parallel to maximize data throughput to storage manager server 150. HSM client 140 can be implemented to allow various levels of granularity for migration of data—files can be migrated individually, and file systems can be partially or fully migrated, based on a comprehensive set of policy parameters like file size, age, or last access. The user of client system 120 can see migrated files in the same manner as any file that is physically stored on file system 122, and migrated files can be accessed in the same manner as any other file of the same file type. The actual location of all data objects at all times can be automatically tracked within database 152. HSM client 140 can communicate with server 150 using, for example TCP/IP protocols, or more efficient loopback communication methods in exemplary embodiments in which the HSM client resides on the same system as server 150.

HSM client 140 can be configured to automatically migrate rarely-accessed files to offline storage repository 154, without disrupting the most frequently used files on client system 120. As shown in the example illustrated in FIG. 2, when HSM client 140 migrates a file 142, that file is moved from online storage on the client system 120 to the offline migration storage pool in storage repository 154 on server 150. A placeholder stub 144 is left on file system 122 to replace migrated file 142 and enable recall of the migrated file if the file is accessed on client system 120 after it is moved to offline storage. To a user of client system 120, stub file 144 looks and acts like regular file 142 did, and this recall happens automatically and transparently via the stub, which contains the necessary metadata to recall the migrated file.

Figure 2:
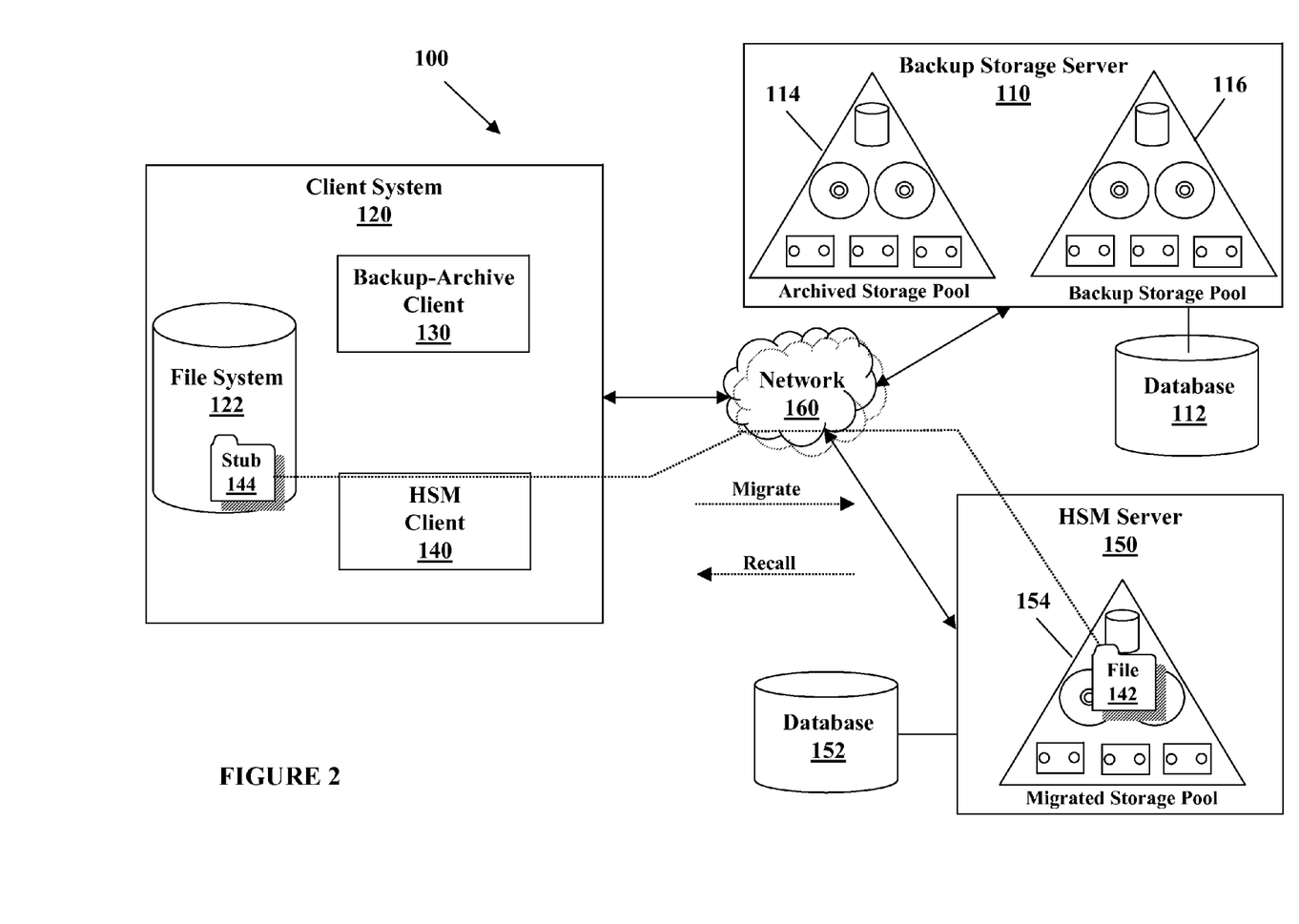
FIGS. 2 and 3 are a block diagrams illustrating the results of example operations performed by an exemplary embodiment of the present invention within the exemplary environment of FIG. 1.

The metadata information provided in the stub files includes the location on server 150 where the associated file contents have been migrated to and the location on client system 120 where the file contents were migrated from. When a file is migrated to storage repository 154, HSM client 140 checks the file to determine if a version of the file already exists in the migration storage pool. If it does and the content of the two versions is different, the new version is migrated to storage repository 154. If the file exists but has not been changed, it is replaced (again) by a stub file pointing to the original entry in storage repository 154. When a security descriptor is changed on a migrated file on client system 120, the next migration job on that file will recall and re-migrate the file, so that the security of the file is stored correctly on server 150. When the user or an application accesses a stub associated with a migrated file, the client operating system transparently directs a file access request to HSM client 140, which can then automatically recall the complete file by retrieving the associated file content from storage repository 154 and copying the file content back to client system 120. When a file is recalled and restored, the next migration job on that file will re-migrate the file and replace the file with a new stub file. Subsequent recalls can restore the most recent version of the file.

Backup-archive client 130 is configured to send data to backup storage server 110 and provides the operational backup and archival functions, which include, for example, incremental backup, selective backup, archive, retrieve, and restore operations. Backup-archive client 130 can be implemented as a multi-session client to exploit multi-threading capabilities of modern operating systems and enable the running of these operations in parallel to maximize data throughput to storage manager server 110. Depending on the platform of client system 120, backup-archive client 130 can provide a graphical, command line, or Web user interface, or a combination of these interfaces in exemplary embodiments. Backup-archive client 130 can communicate with server 110 using, for example TCP/IP protocols, or more efficient loopback communication methods in exemplary embodiments in which the backup-archive client resides on the same system as server 110.

A backup operation refers to the creation of an additional copy of a data object to be used for operational recovery. The selection of data objects to be backed-up should be performed carefully to ensure that, when restored, the data is still usable. A data object can be a file, a part of a file, a directory, or a user defined data object such as a database table. As shown by the example illustrated in FIG. 3, backup-archive client 130, in performing a backup of a file 132, sends a copy of the file to server 110, where it is stored as a separate backup file 134 in a backup storage pool in storage repository 116. Several backup versions of the data can be made, each version at a different point-in-time. These versions are closely tied together and related to the original object as a group of backups, and storage manager server 110 manages the retention of these objects in a consistent way. When backing up files, server 110 maintains a list of all files and their attributes (for example, time, size, access control lists, extended attributes, etc.) in database 112. At each file backup operation, this list is compared to the current file system on the client workstation to determine new, deleted, and changed files. In exemplary embodiments, server 110 can implement policies to regularly reorganize the storage media to store the client's data physically together on a small number of media—to provide faster access in the case of a complete system recovery—in a manner that is transparent to client system 120, and is completely automated on the server using metadata information stored in the database 112.

Figure 3:
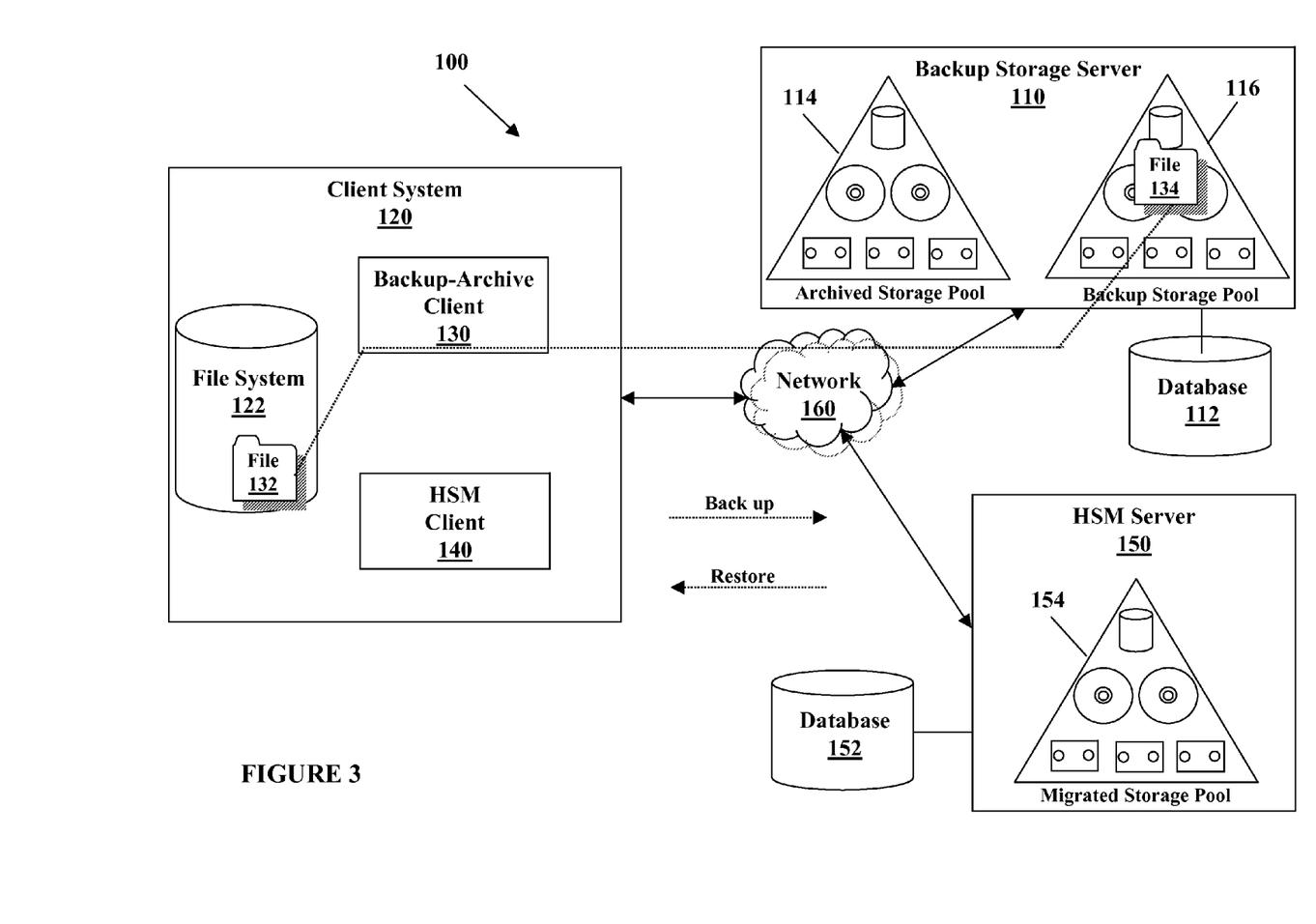

If the original data object (for example, file 132) is corrupted or lost on client system 120, a restore operation is used to send a backup version (for example, file 134) of the data from server 110 back to the client system. When a file is requested to be restored, backup-archive client 130 specifies the file name, directory, and a point in time to server 110, and the server gets the location of the object(s) to restore from database 112. Typically, the most current version of the data (the "active" backup) will be selected as the default version to be restored, but any of the other existing backup versions (the "inactive" backups) can be selected to be sent on a restore. The number and retention period of backup versions is controlled by the policy definitions maintained in database 112. For example, server 110 can be implemented with policies to automatically delete old (extra) backup versions as new versions are created, if the number of versions stored exceeds the defined limit, or after a specified period of time.

Server 110 can store a number of backup versions for each file or object on each client node. If and when the number of versions exceeds the number set in the policies (for example, by a server administrator), older versions are deleted as newer versions are being backed up. Each time a file is backed up, the related directory information and access information is also backed up.

In exemplary embodiments, backup-archive client 130 can be configured to perform several different types of backup operations. These types can include, for example, incremental backup, selective backup, adaptive subfile backup, and image backup. Each type may provide different backup/restore efficiency, retention periods, portability, CPU utilization, connection time, and network utilization.

An incremental backup backs up files, directories, or subdirectories that are new or have changed since the last incremental backup. In performing incremental backup, backup-archive client 130 first performs a full backup in which all files of file system 122 are backed up. This first backup is followed by incremental backups, in which only files that have changed since the last backup are backed up, or differential backups, in which all files that have changed since the last full backup are backed up. This allows server 110 to maintain current versions of the files without dedicating resources to backing up files that already exist in the backup storage pool. During an incremental backup operation, backup-archive client 130 performs a full scan of the client file system 122 and queries server 110 so that it knows what files are currently stored in storage repository 116 so that all files and other information necessary to ensure that the inventory of the server matches the current state of the storage of client system 120 can be sent to the server. Backup-archive client 130 then uses this information to: back up new files, back up files whose contents have changed, and expire backup versions on server 110 for files that were deleted from file system 122 (so that files that no longer exist on client system 120 will not have active backup versions on the server). Changes to the content of a file since the last backup can include, for example, changes in file size, data and time of last modification, and file security descriptors. It is not necessary for backup-archive client 130 to perform any additional full backups of client system 120 after the first backup. Implemented in this fashion, incremental backup eliminates the need to retransmit backup data that has not been changed during successive backup operations. On restore, the specific version of the file that is needed by the user can be restored (if currently available as determined by the retention parameters).

Backup-archive client 130 can be configured to perform both full and partial incremental backups, as directed through its user interface by the user of client system 120. On a full incremental backup, backup-archive client 130 will perform incremental backup on the entirety of the data stored in file system 122. On a partial incremental backup, backup-archive client 130 will perform incremental backup only on single directory trees or individual files in file system 122 as selected by user. Backup-archive client 130 can also be configured to perform incremental-by-date backups. To be able to perform an incremental-by-date backup, backup-archive client must have already performed a full incremental backup of all files of client system 120. On an incremental-by-date backup, backup-archive client 130 backs up only those files whose modification date and time is later than the date and time of the last incremental backup of the file system. Files added to the file system after the last incremental backup, but with a modification date earlier than the last incremental backup, are not backed up. If a full incremental-by-date backup is run, server 110 updates the date and time of the last incremental backup. If only a partial incremental-by-date backup is run, server 110 does not update the date of the last full incremental backup. In this case, the next incremental-by-date backup will backup these files again. Full incremental, partial incremental, and incremental-by-date all back up new and changed files. An incremental-by-date backup might not place exactly the same backup files into the backup storage pool maintained in storage repository 116 because the incremental-by-date backup does not expire backup versions of files deleted from client system 120 and does not back up files with attributes that change, unless the modification dates and times also change.

Incremental backups are generally performed as part of an automated system to back up entire file systems. In contrast, selective backups allow a user to manually select a set of files to back up. A selective backup backs up specific selected files or directories unconditionally. In performing selective backup, backup-archive client 130 backs up client files that are selected by the user, regardless of whether the files have changed since the last backup. Thus, copies of files are sent to server 110 even if they have not changed since the last backup. Selective backup enables users to protect a subset of their data independent of the normal incremental backup process, and also enables to users to restore the specific version of the file that is needed. A selective backup does not cause server 110 to update the date and time of the last incremental backup.

An archive operation refers to the creation a copy of a file as a separate object to be retained for a specific period of time in an archival storage pool maintained by server 110. For example, this function could be used to create an additional copy of data to be saved for historical purposes. Vital records (data that must be kept for legal or other business reasons) are likely candidates for the archive process. In the present exemplary embodiment, the archival storage pool is maintained by server 110 within data repository 114. In alternative exemplary embodiments, the archival storage pool could be maintained by server 110 along with the back storage pool within a single data repository. Once the archive copy is created on server 110, the original copy of the data in file system 122 may be deleted. In this way, archiving can be performed to make additional space available on client system 120.

A primary difference between the backup and archive operations is that backup creates and controls multiple backup versions that are directly attached to the original client file, while archive creates an additional stored object that is normally kept for a specific period of time, as in the case of vital records. For locating archived data within storage repository 114, backup-archive client 130 can be implemented to permit a user to add a description of the data and to form archive packages of related files. A retrieve operation can be used to access archived data and return it to backup-archive client 130. To determine which data to retrieve, the description field can be used by server 110 to search database 112 for matching packages.

In exemplary embodiments in which the client-server architecture of storage management environment 100 is implemented using a traditional LAN and WAN environment, during a backup or archive operation, backup-archive client 130 establishes a session with server 110, reads data from locally attached disks, and sends the data over the LAN or WAN to storage manager server 110. Server 110 receives the data, and then writes it out to the appropriate storage pool (for example, tape, disk, or optical media) in storage repositories 114, 116 based on predefined policies in database 112 and server configuration. In addition, control information is sent over the network to server 110. During a restore or retrieve operation, data is read by server 110 and sent via the network to client system 120. Backup-archive client 130 receives the data, and then writes it back to local attached storage devices.

When original files are migrated to server 150 by HSM client 140 and replaced by stub files in file system 122, the stub files themselves are backed up by backup-archive client 130 when a full backup or incremental backup is initiated because the files have changed—they became stub files. A stub file will be backed up again if server 110 determines that the stub file has changed (for example, security attributes for the existing stub have changed).

As described above, when a file is migrated to server 150 by HSM client 140, there is still only one copy of the file available because the original is deleted on client system 120 and replaced by a stub file. In exemplary embodiments, backup-archive client 130 can be implemented with a stub-backup software module 132 for ensuring, independently of HSM client 140, that when a backup of a stub file is performed, there will also be a separate, complete copy of the associated migrated file content stored in the backup storage pool. In exemplary embodiments, stub-backup module 132 can be implemented for incorporation within backup-archive client 130 as a plug-in, add-on, or extension software module.

Figure 4:
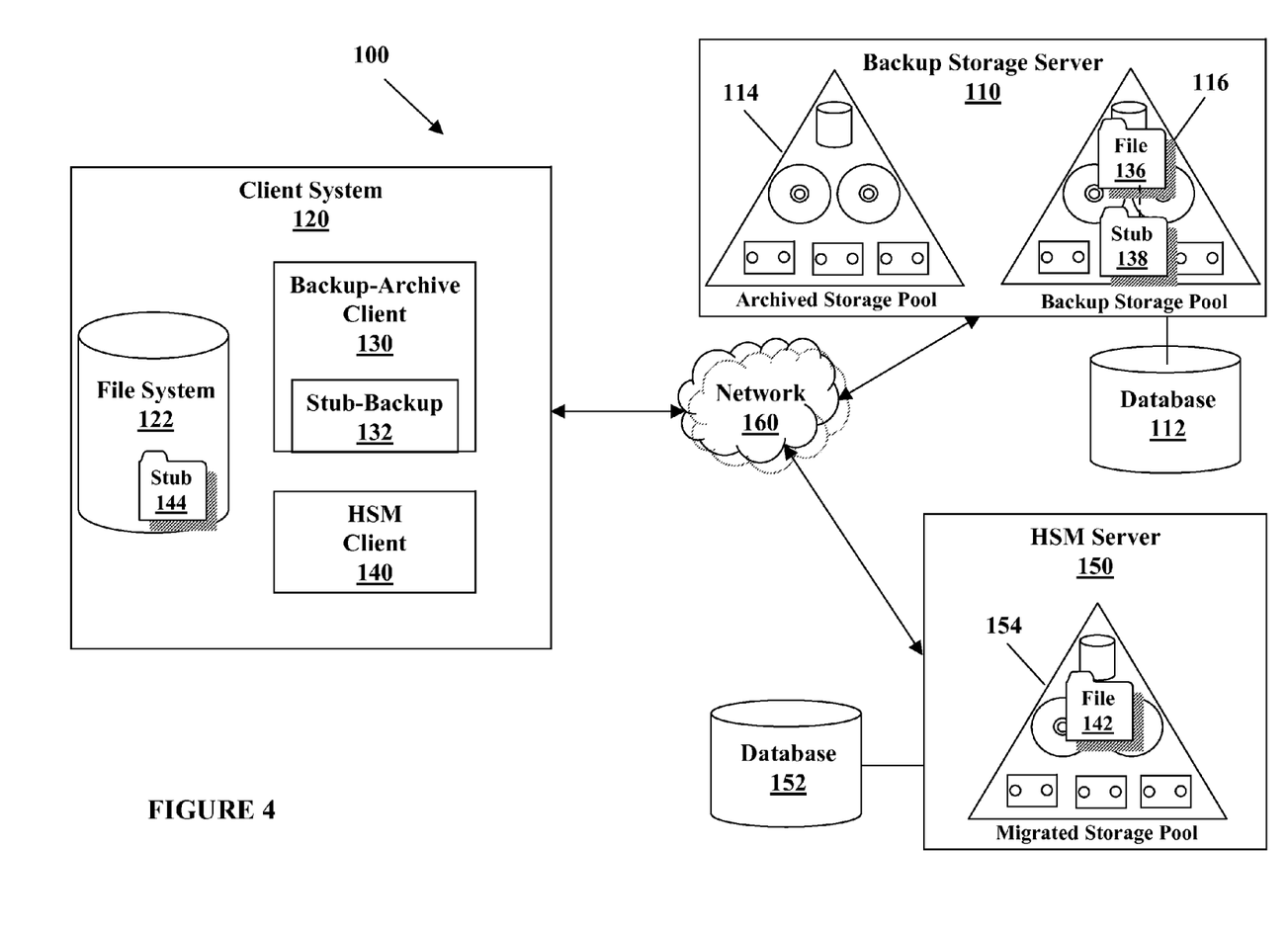
FIG. 4 is a block diagram illustrating an exemplary embodiment of the present invention implemented within the exemplary environment of FIG. 1.

As shown by the exemplary embodiment illustrated in FIG. 4, stub-backup module 132 can ensure that a stub file 144 will always have an associated current copy of the migrated file contents 142 stored as a backup object 136 in the backup storage pool. More specifically, when backup-archive client 130 is performing a backup operation, stub-backup module 132 applies a delta-base relationship to bind together the backup object 136 for the complete file (the base file) and a separate backup object 138 for the corresponding stub (the delta file) in storage repository 116. Thus, server 110 will store the base file content and subsequent delta stub files that depend on the last complete backup of the base file content. The stub files are backed up as a differential backup relative to the base file. Because delta stub files are useless without the corresponding base file, server 110 is implemented to process the expiration of base files differently. More specifically, as a result of the delta-base binding, whenever there is a delta stub object that references the object containing the base file content, server 110 will not expire the object containing the file content. By using logical file grouping applied by stub-backup module 132, whereby the base and delta files are logically associated (as depicted by the dashed line in the example illustrated in FIG. 4), server 110 can recognize a base file as eligible for expiration but will not delete the file until each of its dependent delta files has expired. In applying this relationship, stub-backup module 132 does not create or modify any existing data structure on server 110. Rather, the binding will change the way server 110 interprets existing structures—the delta stub file and the complete base file are associated with each other and managed as a single version of the file by the server.

Stub-backup module 132 can thereby be implemented within backup-archive client 130 to enable the backup-archive client to, when restoring files, always recreate the complete file from backup only, even in the case of a problem with HSM client 140 (for example, if the copy in the HSM archive has been erroneously deleted or if HSM server 150 becomes unavailable). Thus, on a restore of a file that has been migrated, the file can be restored as either the stub object or the corresponding file object. In situations where the stub object is missing, the file contents can be restored. The application of the delta-base relationship, as well as the restore of either the delta file or the base file for a migrated file, is performed automatically and transparently to the user.

The procedures for applying the delta-base relationship between backup objects for the content of migrated files and their associated stub files created by HSM client 140 are implemented within backup-archive client 130 in several operations performed by stub-backup module 132. Generally, when backup-archive client 130 is performing a back up of a migrated file, stub-backup module 132 will first ensure that the actual file contents are backed up as a base file object, and then direct backup the stub file as a delta file component. The base file and the delta file correspond to the same version of the same file. The creation of a delta-base relationship requires that backup-archive client 130 have performed a backup of the complete file contents, which is considered to be the base file backup. To satisfy this requirement, when backup-archive client 130 is performing a backup of a stub file, stub-backup module 132 checks to determine if a version of the actual file corresponding to the stub file has already been backed up in storage repository 116. If it has, backup-archive client 130 employs stub-backup module 132 to back up the stub file to storage repository 116 and create the delta-base relationship. If the version of the actual file corresponding to the stub file has not been backed up, stub-backup module 132 directs backup-archive client 130 to read the file on client system 120 as if the file were resident, thereby triggering HSM client 140 to recall and restore the actual file content from the migration storage pool maintained by server 150, and then backup-archive client 130 stores a backup copy of the now-restored file in storage repository 116. After a subsequent migration, backup-archive client 130 then employs stub-backup module 132 to back up the corresponding stub file to storage repository 116 and create the delta-base relationship. In other words, for migrated files, there can exist one copy of the file contents on server 150 created by HSM client 140 in the migration storage pool, and a separate backup copy of the file contents on server 110 in the backup storage pool created by backup-archive client 130. On subsequent backups of a stub file, if there has been a change to the stub file since that stub file was last backed up, stub-backup module 132 will direct backup-archive client 130 to create a new delta file to backup the changed stub file and logically associate this delta file with the same base file backing up the contents of the actual file corresponding to the delta stub files.

In exemplary embodiments, stub-backup module 132 can be implemented within backup-archive client 132 to apply the delta-base relationship when the backup-archive client is performing selective backup, incremental backup, and archival operations. To apply the delta-base relationship procedures when backup-archive client 130 is performing a selective back up of a migrated file, stub-backup module 132 will always force the recall of the actual file by HSM client 140. As a result, the changes that have been made for the first step of backup integration will be changed back for selective backup. That is, where backup-archive client 130 has already performed a backup of the complete file contents for the migrated file (which would be the base file backup), stub-backup module 132 will direct the backup-archive client to replace this prior backup of the base contents in the backup storage pool with a new backup of the file contents after the file has been recalled from data repository 154, and the stub-backup module will force restoration of any delta stub files corresponding to the prior backup. Similarly, to apply the delta-base relationship procedures when archiving a migrated file, stub-backup module 132 will always force the recall of the actual file by HSM client 140. Thus, when performing either an archive operation or a selective backup, a fetch of a migrated file is always performed by HSM client 140 before backup-archive client 130 backs up or archives the file, even if the file has not changed since the last backup, and any stubs corresponding to the file will be restored from the backup storage pool. Because backup-archive client 130 will always send the complete file to server 110 on an archive operation, the backup-archive client will always restore the complete file on a retrieve operation. If the object was archived as a stub by a different backup-archive client not implemented to apply the delta-base relationship, stub-backup module 132 will determine whether the stub will be accessible. If the stub file is not accessible, stub-backup module 132 will direct backup-archive client 130 to issue an error message to client system 120, but still recreate the stub and apply the delta-base relationship between the stub file and the archived file.

To apply the delta-base relationship procedures when backup-archive client 130 is performing an incremental backup of a stub file, stub-backup module 132 will first determine whether the actual file was successfully backed up before having been migrated (that is, whether there is a valid copy of the file content object in the backup storage pool on server 110). If this is true, stub-backup module 132 will direct backup-archive client 130 to back up the stub as a delta file to the existing backup of the full file (the base file). If the actual file has been changed in between the previous backup and the migration or if the file has never been backed up before migration, stub-backup module 132 will direct backup-archive client 130 to trigger recall of the file rather than backup of the stub file. Thus, all migrated files that have not been backed up as complete files before will be recalled during incremental backup. A user can avoid this situation by enabling an option within HSM client 140 to direct "backup before migrate" to be performed in exemplary embodiments in which such an option is provided by the HSM client. Where this backup before migrate option is selected, HSM client 140 invokes backup-archive client 130 to perform a backup of all files selected for migration and will then migrate only those files that have been successfully backed up. This helps to ensure that the latest content of a file is also stored in the backup storage pool within storage repository 116 before the file is migrated by HSM client 140 to the migration storage pool. The backup before migrate function backs up only resident files, which would be migrated, and not stub files. To apply the delta-base relationship procedures when performing an incremental-by-date backup, stub-backup module 132 will direct backup-archive client 130 to ignore stub files.

In exemplary embodiments, to verify whether a file has been backed up, backup-archive client 130 can be configured write an AUDIT log for backup operations performed when the backup before migrate option is selected. Before HSM client 140 migrates a file, it needs to verify that the file has been successfully backed up onto server 110. The AUDIT log created by backup-archive client 130 will create exactly one failure, success, or excluded message for each file for each backup operation, and each log entry can include information such as the file name and a timestamp. As a result, HSM client 140 is now able to perform a detailed analysis of the AUDIT log to prevent situations where files are migrated, although they were not backed up. This change is transparent to the user. Management of the AUDIT log (for example, deletion of log entries) can be performed by backup-archive client 130.

In situations where an incremental backup operation is performed on a file when there is no valid backup of the original file, where a selective backup of a file is performed, or where an archive operation is performed on a file, if stub-backup module 132 detects for a certain stub file that the corresponding file content, and not the stub, will need to be stored on server 110, backup-archive client 130 will be directed to read the content of the file and send it to the backup storage pool. Because the file will thus be opened for reading, HSM client 140 will be triggered to recall the content of the file from the migration storage pool. Once the recall is completed, backup-archive client 130 can proceed with the particular operation. If the recall is not possible, the particular operation (backup or archive) on this file will also fail. After the operation is performed, the resident file will remain in client file system 122 until HSM client 140 replaces it with a stub file again on the next migration job. If a stub file has been moved, backup-archive client 130 is configured to trigger HSM client 140 to recall the migrated file on an incremental backup.

If files have been migrated to offline storage by HSM 140 and backed up by a different client application not implemented to apply the delta-base relationship, stub-backup module 132 can be configured to trigger recalls of all migrated files on the initial, full backup performed for incremental backup. In this situation, if no additional action is taken, there is a chance client system 120 will be overwhelmed by this forced recall of all migrated files—such a mass recall could impact free disk space as well as affect the overall system and network performance.

In exemplary embodiments, stub-backup module 132 can be configured to provide options through the user interface provided by backup-archive client 130 to help the user of client system 120 avoid these mass recall situations. For example, stub-backup module 132 can implement a client "skip migrated files" option for the user. This option regulates backup and archive operations on stubs. If the SKIPMIGRATED is set to NO, the behavior is different if an incremental backup operation is performed compared to a selective backup or archive operation. A selective backup or an archive operation with SKIPMIGRATED set to NO will always force recall of the files and then perform the specific operation (selective backup or archiving the files). After the selective backup or archiving operation is finished the files are not automatically re-migrated. In exemplary embodiments, this could be performed separately by HSM client 140. An incremental backup with SKIPMIGRATED set to NO will result in recall of the files for which an appropriate copy of the complete files does not exist in the backup storage pool, and then a backup of the complete files. In exemplary embodiments, the files could then be re-migrated by HSM client 140. If a copy of a re-migrated file already exists in the backup storage pool, the corresponding stub file will be backed up and linked with the last complete file in the backup. As described above, the backup stub file and the backup of the complete file contents are always logically associated with each other and managed as a single related group of the file in server 110. Therefore, the backup of the complete file will not be expired until the backup of the stub expires.

If SKIPMIGRATED is set to YES for any incremental, selective, or archive operation, stub-backup module 132 will direct backup-archive client 130 to ignore stub files on the initial, full backup performed for incremental backup. Thus, a normal backup can be run with SKIPMIGRATED set to YES to avoid massive recalls and to backup the resident files only. With this option set, backup-archive client 130 still backs up the active (not-migrated) data in the file system. In parallel, the directories which contain the stub files can be backed up directory by directory with the option SKIPMIGRATED set to NO to control the amount of recalls. After the backup of these directories is done, files can be re-migrated by HSM client 140.

In exemplary embodiments, to help avoid mass recall situations on the initial, full backup performed on a full incremental backup, stub-backup module 132 can be implemented to trigger re-migration of the recalled file by, for example, invoking HSM client 140 through the HSM client's command line interface or by directing backup-archive client 130 to perform the re-migration itself by accessing the migration storage pool on server 110 using, for example, an HSM plug-in component configured to interface with HSM server 150.

In consideration of the delta-base relationship procedures, when backup-archive client 130 is performing a restore operation, stub-backup module 132 can be implemented to allow the backup-archive client to simply restore a resident file in the regular fashion if the last backup of the file was from the resident file (that is, the file had not been migrated by HSM client 140). If the last backup of a file was performed on a stub after the file had been migrated, stub-backup module 132 can be implemented to direct backup-archive client 130 to either restore the stub or the actual full file. Thus, on restore of a delta stub file, server 110 can be requested to send the stub and/or the corresponding resident file to backup-archive client 130 (that is, the file content can be sent back to client system 120, even if it is the stub that will be restored).

In exemplary embodiments, stub-backup module 132 can be configured to provide a "restore as migrated file" option through the user interface provided by backup-archive client 130 to define which of the stub file or the complete file will be restored according to a RESTOREMIGSTATE setting. The user of client system 120 can set RESTOREMIGSTATE to either YES or NO, which respectively correspond to "restore as migrated file" or to not to "restore as migrated file". If RESTOREMIGSTATE is set to NO, stub-backup module 132 will always direct backup-archive client 130 to restore the resident file. If RESTOREMIGSTATE is set to YES, then the determination of whether to restore the stub can further depend on the type of the target file system, the target location, and whether the file content can be recalled.

In exemplary embodiments, stub-backup module 132 can further be configured to provide a "restore resident if not accessible" option through the user interface provided by backup-archive client 130 to determine whether to verify the accessibility of a stub file according to a RESTORECHECKSTUBACCESS setting. The option RESTORECHECKSTUBACCESS is applicable only if the value of RESTOREMIGSTATE is set to YES (because if RESTOREMIGSTATE is NO, stub-backup module 132 will direct backup-archive client 130 to always restore the resident file and thus does not need to check for the readability of the stub). If RESTORECHECKSTUBACCESS is set to NO, stub-backup module 132 will not verify the readability of a stub file before determining whether to restore the corresponding file as a stub. Thus, when RESTORECHECKSTUBACCESS is set to NO, backup-archive client 130 is configured to assume that the stub is readable to avoid out-of-space conditions. This can save network traffic and minimize the amount of temporary space needed.

If RESTORECHECKSTUBACCESS is set to YES, stub-backup module 132 will enable backup-archive client 130 to verify the readability of a stub file before determining whether to restore the corresponding file as a stub. If the stub file is not readable when RESTORECHECKSTUBACCESS is set to YES, backup-archive client 130 will restore the file completely (in the resident state) and not as a stub. When RESTORECHECKSTUBACCESS is set to YES, the following conditions must also be met for a file to only be restored as stub: (1) The file was migrated by HSM client 140 on the last backup; (2) the restored object is the active version; (3) the original file system and the target file system are of the same type; and (4) the file system, high level name, and low level name are identical (source and destination). It may be desirable to restore only the stub if possible, as this will reduce the restore time because a smaller amount of data is transmitted, and this also saves space on client system—the whole file will only be required to be restored if and when it is recalled.

In exemplary embodiments in which HSM client 140 is provided by a third party vendor (and therefore, the stub file is formatted in a third party format), stub-backup module 132 can be implemented within backup-archive client 130 to perform operations as described above for ensuring that when a backup of a stub file is performed, there will also be a separate, complete copy of the associated migrated file content stored in the backup storage pool. In these embodiments, stub-backup module 132 can be provided by the third party as a plug-in, add-on, extension software module for incorporation within the backup-archive client component. Thus, stub-backup module 132 will be used by backup-archive client 130 in performing backup and restore operations to enable backup protection of a migrated file in case of a problem with HSM client 140 even where the backup-archive client is implemented with only minimal knowledge about the third party product. Therefore, it will not be necessary for backup-archive client 130 to be implemented to consider any third party HSM code, as this can be encapsulated within the stub-backup plug-in module provided by the third party. For example, the third party stub-backup module can be implemented with an interface to third party HSM server 150 for enabling backup-archive client 130 to perform verification of the accessibility of a stub file if the RESTORECHECKSTUBACCESS option is set to YES by the user of client system 120. As another example, the third party stub-backup module can be implemented to enable backup-archive client 130 to perform re-migration itself by accessing the migration storage pool in situations where the third party HSM client prevents recall of stub files accessed through certain applications. The third party stub-backup module can also be implemented in such a manner to enable backup-archive client 130 to temporarily recall the file during a backup or archive operation and then re-migrate the file immediately following this operation.

Exemplary embodiments of the present invention can be realized in hardware, software, or a combination of hardware and software. Exemplary embodiments can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system in which exemplary embodiments can be implemented may include, inter alia, one or more computers and at least a computer program product on a computer readable medium, allowing a computer system to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allows a computer system to read such computer readable information.

Figure 5:
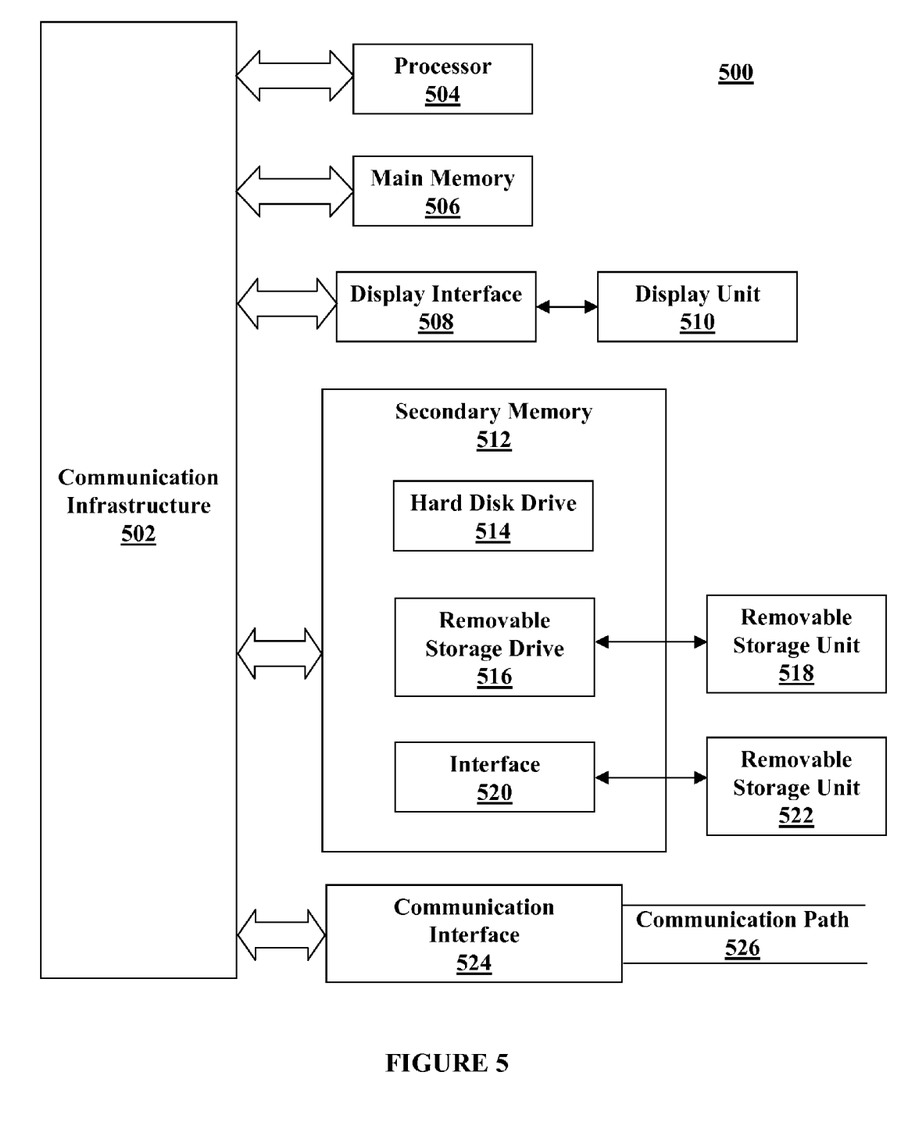
FIG. 5 is a block diagram illustrating an exemplary computer system within which exemplary embodiments of the present invention can be implemented.

FIG. 5 is a block diagram of an exemplary computer system 500 that can be used for implementing exemplary embodiments of the present invention. Computer system 500 includes one or more processors, such as processor 504. Processor 504 is connected to a communication infrastructure 502 (for example, a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Exemplary computer system 500 can include a display interface 508 that forwards graphics, text, and other data from the communication infrastructure 502 (or from a frame buffer not shown) for display on a display unit 510. Computer system 500 also includes a main memory 506, which can be random access memory (RAM), and may also include a secondary memory 512. Secondary memory 512 may include, for example, a hard disk drive 514 and/or a removable storage drive 516, representing a floppy disk drive, a magnetic tape drive, an optical disk drive, etc. Removable storage drive 516 reads from and/or writes to a removable storage unit 518 in a manner well known to those having ordinary skill in the art. Removable storage unit 518, represents, for example, a floppy disk, magnetic tape, optical disk, etc. which is read by and written to by removable storage drive 516. As will be appreciated, removable storage unit 518 includes a computer usable storage medium having stored therein computer software and/or data.

In exemplary embodiments, secondary memory 512 may include other similar means for allowing computer programs or other instructions to be loaded into the computer system. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between the computer system and external devices. Examples of communications interface 524 may include a modem, a network interface (such as an Ethernet card), a communications port, a PCMCIA slot and card, etc. Software and data transferred via communications interface 524 are in the form of signals which may be, for example, electronic, electromagnetic, optical, or other signals capable of being received by communications interface 524. These signals are provided to communications interface 524 via a communications path (that is, channel) 526. Channel 526 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 506 and secondary memory 512, removable storage drive 516, a hard disk installed in hard disk drive 514, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network that allows a computer system to read such computer readable information.

Computer programs (also called computer control logic) are stored in main memory 506 and/or secondary memory 512. Computer programs may also be received via communications interface 524. Such computer programs, when executed, can enable the computer system to perform the features of exemplary embodiments of the present invention as discussed herein. In particular, the computer programs, when executed, enable processor 504 to perform the features of computer system 500. Accordingly, such computer programs represent controllers of the computer system.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A method for performing a backup of a stub object located on a file system managed by a hierarchical storage manager configured to migrate data objects from the file system to a migration storage pool, the stub object including information for recalling a migrated data object, the method comprising:
   determining whether a backup copy of the migrated data object is stored in a backup storage pool if the backup is performed in an incremental backup operation;
   directing the hierarchical storage manager to recall the migrated data object to the file system if the backup copy of the migrated data object is not stored in the backup storage pool or if the backup is performed in a selective backup operation;
   creating the backup copy of the migrated data object if the migrated data object is recalled;
   storing the backup copy of the migrated data object in the backup storage pool if the migrated data object is recalled;
   creating a backup copy of the stub object if the migrated data object is not recalled; and
   storing the backup copy of the stub object from the file system in the backup storage pool if the migrated data object is not recalled.

2. The method of claim 1, wherein the backup copy of the stub object and the backup copy of the migrated data object are bound together, and the method further comprises:
   storing one or more delta stub objects comprising changes since the creation of the backup copy of the stub object;
   preventing the backup copy of the migrated data object from expiring if at least one of the one or more delta stub objects references the backup copy of the migrated data object; and
   expiring the backup copy of the migrated data object responsive to determining that all of the one or more delta stub objects that reference the backup copy of the migrated data object have expired.

3. The method of claim 1, further comprising providing a selectable option to a user of a client system hosting the file system via a user interface implemented within a storage module running on the client system, the storage module being configured to create and store a backup copy of each data object selected for migration by the hierarchical storage manager in the backup storage pool before the data object is migrated to the migration storage pool if the selectable option is selected.

4. The method of claim 1, further comprising providing a selectable option to a user of a client system hosting the file system via a user interface implemented within a storage module running on the client system, the storage module being configured to implement procedures for creating and storing backup copies of data on the file system in the backup storage pool, the storage module being further configured to not create and store backup copies of stub data on the file system in the backup storage pool if the selectable option is selected.

5. The method of claim 1, further comprising providing a selectable option to a user of a client system hosting the file system via a user interface implemented within a storage module running on the client system, the storage module being configured to implement procedures for restoring backup copies of data from the backup storage pool to the file system, the storage module being further configured to restore the backup copy of the stub object on a restore of the stub object only if the selectable option is selected, the stub object is accessible on the backup storage pool, and the migrated data object had been migrated when the backup copy of the migrated data object was stored on the backup storage pool, the storage module being further configured to restore the backup copy of the migrated data object on the restore of the stub object if the backup copy of the stub object is not restored.

6. The method of claim 1, wherein the backup storage pool is managed by a first server system, wherein the migration storage pool is managed by a second server system, and wherein a client system hosting the file system is communicatively connected to the first and second server systems via a network.

7. The method of claim 1, further comprising receiving an instruction to perform an archive of a second stub object on the file system that includes information for recalling a second migrated data object, directing the hierarchical storage manager to recall the second migrated data object to the file system, creating an archive copy of the second migrated data object, and storing the archive copy of the second migrated data object in an archive storage pool.

8. A system for performing a backup of a stub object located on a file system, the system comprising:
 a hierarchical storage management computer configured to migrate data objects from the file system to a migration storage pool, the hierarchical storage management computer performing a method, comprising:
 determining whether a backup copy of a migrated data object is stored in a backup storage pool if the backup is performed in an incremental backup operation;
 directing the hierarchical storage management computer to recall the migrated data object to the file system if the backup copy of the migrated data object is not stored in the backup storage pool or if the backup is performed in a selective backup operation;
 creating the backup copy of the migrated data object if the migrated data object is recalled;
 storing the backup copy of the migrated data object in the backup storage pool if the migrated data object is recalled;
 creating a backup copy of the stub object if the migrated data object is not recalled; and
 storing the backup copy of the stub object from the file system in the backup storage pool if the migrated data object is not recalled.

9. The system of claim 8, wherein the backup copy of the stub object and the backup copy of the migrated data object are bound together, and the method further comprises:
 storing one or more delta stub objects comprising changes since the creation of the backup copy of the stub object;
 preventing the backup copy of the migrated data object from expiring if at least one of the one or more delta stub objects references the backup copy of the migrated data object; and
 expiring the backup copy of the migrated data object responsive to determining that all of the one or more delta stub objects that reference the backup copy of the migrated data object have expired.

10. The system of claim 8, further comprising providing a selectable option to a user of a client system hosting the file system via a user interface implemented within a storage module running on the client system, the storage module being configured to create and store a backup copy of each data object selected for migration by the hierarchical storage management computer in the backup storage pool before the data object is migrated to the migration storage pool if the selectable option is selected.

11. The system of claim 8, further comprising providing a selectable option to a user of a client system hosting the file system via a user interface implemented within a storage module running on the client system, the storage module being configured to implement procedures for creating and storing backup copies of data on the file system in the backup storage pool, the storage module being further configured to not create and store backup copies of stub data on the file system in the backup storage pool if the selectable option is selected.

12. The system of claim 8, further comprising providing a selectable option to a user of a client system hosting the file system via a user interface implemented within a storage module running on the client system, the storage module being configured to implement procedures for restoring backup copies of data from the backup storage pool to the file system, the storage module being further configured to restore the backup copy of the stub object on a restore of the stub object only if the selectable option is selected, the stub object is accessible on the backup storage pool, and the migrated data object had been migrated when the backup copy of the migrated data object was stored on the backup storage pool, the storage module being further configured to restore the backup copy of the migrated data object on the restore of the stub object if the backup copy of the stub object is not restored.

13. The system of claim 8, wherein the backup storage pool is managed by a first server system, wherein the migration storage pool is managed by a second server system, and wherein a client system hosting the file system is communicatively connected to the first and second server systems via a network.

14. The system of claim 8, further comprising receiving an instruction to perform an archive of a second stub object on the file system that includes information for recalling a second migrated data object, directing the hierarchical storage management computer to recall the second migrated data object to the file system, creating an archive copy of the second migrated data object, and storing the archive copy of the second migrated data object in an archive storage pool.

15. A computer program product for performing a backup of a stub object located on a file system managed by a hierarchical storage manager configured to migrate data objects from the file system to a migration storage pool, the stub object including information for recalling a migrated data object, the computer program product comprising:
 a non-transitory tangible computer readable storage medium having computer readable program code embodied therewith, the computer readable program code for execution by a processor to perform a method, the method comprising:
 determining whether a backup copy of the migrated data object is stored in a backup storage pool if the backup is performed in an incremental backup operation;
 directing the hierarchical storage manager to recall the migrated data object to the file system if the backup copy of the migrated data object is not stored in the backup storage pool or if the backup is performed in a selective backup operation;
 creating the backup copy of the migrated data object if the migrated data object is recalled;

storing the backup copy of the migrated data object in the backup storage pool if the migrated data object is recalled;

creating a backup copy of the stub object if the migrated data object is not recalled; and storing the backup copy of the stub object from the file system in the backup storage pool if the migrated data object is not recalled.

16. The computer program product of claim 15, wherein the backup copy of the stub object and the backup copy of the migrated data object are bound together, and the method further comprises:

storing one or more delta stub objects comprising changes since the creation of the backup copy of the stub object;

preventing the backup copy of the migrated data object from expiring if at least one of the one or more delta stub objects references the backup copy of the migrated data object; and expiring the backup copy of the migrated data object responsive to determining that all of the one or more delta stub objects that reference the backup copy of the migrated data object have expired.

17. The computer program product of claim 15, further comprising providing a selectable option to a user of a client system hosting the file system via a user interface implemented within a storage module running on the client system, the storage module being configured to create and store a backup copy of each data object selected for migration by the hierarchical storage manager in the backup storage pool before the data object is migrated to the migration storage pool if the selectable option is selected.

18. The computer program product of claim 15, further comprising providing a selectable option to a user of a client system hosting the file system via a user interface implemented within a storage module running on the client system, the storage module being configured to implement procedures for creating and storing backup copies of data on the file system in the backup storage pool, the storage module being further configured to not create and store backup copies of stub data on the file system in the backup storage pool if the selectable option is selected.

19. The computer program product of claim 15, further comprising providing a selectable option to a user of a client system hosting the file system via a user interface implemented within a storage module running on the client system, the storage module being configured to implement procedures for restoring backup copies of data from the backup storage pool to the file system, the storage module being further configured to restore the backup copy of the stub object on a restore of the stub object only if the selectable option is selected, the stub object is accessible on the backup storage pool, and the migrated data object had been migrated when the backup copy of the migrated data object was stored on the backup storage pool, the storage module being further configured to restore the backup copy of the migrated data object on the restore of the stub object if the backup copy of the stub object is not restored.

20. The computer program product of claim 15, wherein the backup storage pool is managed by a first server system, wherein the migration storage pool is managed by a second server system, and wherein a client system hosting the file system is communicatively connected to the first and second server systems via a network.

* * * * *